(12) United States Patent
Ganzel

(10) Patent No.: US 9,321,444 B2
(45) Date of Patent: Apr. 26, 2016

(54) VEHICLE BRAKE SYSTEM WITH DUAL ACTING PLUNGER ASSEMBLY

(71) Applicant: Kelsey-Hayes Company, Livonia, MI (US)

(72) Inventor: Blaise J. Ganzel, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 120 days.

(21) Appl. No.: 13/843,587

(22) Filed: Mar. 15, 2013

(65) Prior Publication Data

US 2014/0265547 A1    Sep. 18, 2014

(51) Int. Cl.
*B60T 13/74*    (2006.01)
*B60T 13/16*    (2006.01)
*B60T 7/04*    (2006.01)
*B60T 8/40*    (2006.01)

(52) U.S. Cl.
CPC .............. *B60T 13/168* (2013.01); *B60T 7/042* (2013.01); *B60T 8/4081* (2013.01); *B60T 13/166* (2013.01); *B60T 13/745* (2013.01); *B60T 8/4018* (2013.01)

(58) Field of Classification Search
CPC ... B60T 13/168; B60T 13/686; B60T 13/745; B60T 15/028; B60T 15/04; B60T 13/166; B60T 8/4081; B60T 8/4018; F15B 15/04; F15B 2211/20515
USPC ......................................................... 60/545
See application file for complete search history.

(56) References Cited

U.S. PATENT DOCUMENTS

| | | | |
|---|---|---|---|
| 5,433,514 A * | 7/1995 | Tsukamoto et al. | 303/113.2 |
| 5,927,825 A * | 7/1999 | Schenk et al. | 303/115.2 |
| 6,079,797 A | 6/2000 | Ganzel | |
| 6,494,546 B1 | 12/2002 | Feigel | |
| 7,922,264 B2 | 4/2011 | Baumann et al. | |
| 8,038,229 B2 | 10/2011 | Leiber et al. | |
| 2007/0199436 A1 | 8/2007 | Ikeda et al. | |
| 2010/0026083 A1 | 2/2010 | Leiber et al. | |
| 2010/0114444 A1 | 5/2010 | Verhagen et al. | |
| 2011/0120121 A1* | 5/2011 | Sprocq et al. | 60/563 |
| 2011/0120122 A1 | 5/2011 | Cagnac et al. | |
| 2012/0013173 A1 | 1/2012 | Leiber et al. | |
| 2012/0306261 A1 | 12/2012 | Leiber et al. | |
| 2014/0028083 A1* | 1/2014 | Gerdes et al. | 303/6.01 |

FOREIGN PATENT DOCUMENTS

CN    102582605 A    7/2012
DE    102007016863 A1    10/2008
(Continued)

OTHER PUBLICATIONS

PCT International Search Report and Written Opinion, Application No. PCT/US2014/030222, dated Jul. 3, 2014.

*Primary Examiner* — Anna Momper
(74) *Attorney, Agent, or Firm* — MacMillan, Sobanski & Todd, LLC

(57) ABSTRACT

A plunger assembly for use as a pressure source for a brake system includes a housing having first and second ports. A motor is mounted on the housing for driving an actuator. A piston is connected to the actuator. The piston is slidably mounted within the housing. The piston pressurizes a first chamber when the piston is moving in a first direction to provide fluid out of the first port. The piston pressurizes a second chamber when the piston is moving in a second direction to provide fluid out of the second port.

8 Claims, 8 Drawing Sheets

(56) References Cited

FOREIGN PATENT DOCUMENTS

| | | |
|---|---|---|
| DE | 102008014462 A1 | 9/2009 |
| DE | 102011080312 A1 | 2/2012 |
| EP | 2100784 A2 | 9/2009 |
| EP | 2233377 B1 | 6/2012 |
| JP | 2012250559 A | 12/2012 |
| WO | 2008122468 A1 | 10/2008 |
| WO | 2010006978 A1 | 1/2010 |
| WO | 2010006998 A1 | 1/2010 |
| WO | 2012058330 A2 | 5/2012 |

* cited by examiner

VEHICLE BRAKE SYSTEM WITH DUAL ACTING PLUNGER ASSEMBLY

BACKGROUND OF THE INVENTION

This invention relates in general to vehicle braking systems. Vehicles are commonly slowed and stopped with hydraulic brake systems. These systems vary in complexity but a base brake system typically includes a brake pedal, a tandem master cylinder, fluid conduits arranged in two similar but separate brake circuits, and wheel brakes in each circuit. The driver of the vehicle operates a brake pedal which is connected to the master cylinder. When the brake pedal is depressed, the master cylinder generates hydraulic forces in both brake circuits by pressurizing brake fluid. The pressurized fluid travels through the fluid conduit in both circuits to actuate brake cylinders at the wheels to slow the vehicle.

Base brake systems typically use a brake booster which provides a force to the master cylinder which assists the pedal force created by the driver. The booster can be vacuum or hydraulically operated. A typical hydraulic booster senses the movement of the brake pedal and generates pressurized fluid which is introduced into the master cylinder. The fluid from the booster assists the pedal force acting on the pistons of the master cylinder which generate pressurized fluid in the conduit in fluid communication with the wheel brakes. Thus, the pressures generated by the master cylinder are increased. Hydraulic boosters are commonly located adjacent the master cylinder piston and use a boost valve to control the pressurized fluid applied to the booster.

Braking a vehicle in a controlled manner under adverse conditions requires precise application of the brakes by the driver. Under these conditions, a driver can easily apply excessive braking pressure thus causing one or more wheels to lock, resulting in excessive slippage between the wheel and road surface. Such wheel lock-up conditions can lead to greater stopping distances and possible loss of directional control.

Advances in braking technology have led to the introduction of Anti-lock Braking Systems (ABS). An ABS system monitors wheel rotational behavior and selectively applies and relieves brake pressure in the corresponding wheel brakes in order to maintain the wheel speed within a selected slip range to achieve maximum braking force. While such systems are typically adapted to control the braking of each braked wheel of the vehicle, some systems have been developed for controlling the braking of only a portion of the plurality of braked wheels.

Electronically controlled ABS valves, comprising apply valves and dump valves, are located between the master cylinder and the wheel brakes. The ABS valves regulate the pressure between the master cylinder and the wheel brakes. Typically, when activated, these ABS valves operate in three pressure control modes: pressure apply, pressure dump and pressure hold. The apply valves allow pressurized brake fluid into respective ones of the wheel brakes to increase pressure during the apply mode, and the dump valves relieve brake fluid from their associated wheel brakes during the dump mode. Wheel brake pressure is held constant during the hold mode by closing both the apply valves and the dump valves.

To achieve maximum braking forces while maintaining vehicle stability, it is desirable to achieve optimum slip levels at the wheels of both the front and rear axles. During vehicle deceleration different braking forces are required at the front and rear axles to reach the desired slip levels. Therefore, the brake pressures should be proportioned between the front and rear brakes to achieve the highest braking forces at each axle. ABS systems with such ability, known as Dynamic Rear Proportioning (DRP) systems, use the ABS valves to separately control the braking pressures on the front and rear wheels to dynamically achieve optimum braking performance at the front and rear axles under the then current conditions.

A further development in braking technology has led to the introduction of Traction Control (TC) systems. Typically, valves have been added to existing ABS systems to provide a brake system which controls wheel speed during acceleration. Excessive wheel speed during vehicle acceleration leads to wheel slippage and a loss of traction. An electronic control system senses this condition and automatically applies braking pressure to the wheel cylinders of the slipping wheel to reduce the slippage and increase the traction available. In order to achieve optimal vehicle acceleration, pressurized brake fluid is made available to the wheel cylinders even if the master cylinder is not actuated by the driver.

During vehicle motion such as cornering, dynamic forces are generated which can reduce vehicle stability. A Vehicle Stability Control (VSC) brake system improves the stability of the vehicle by counteracting these forces through selective brake actuation. These forces and other vehicle parameters are detected by sensors which signal an electronic control unit. The electronic control unit automatically operates pressure control devices to regulate the amount of hydraulic pressure applied to specific individual wheel brakes. In order to achieve optimal vehicle stability, braking pressures greater than the master cylinder pressure must quickly be available at all times.

Brake systems may also be used for regenerative braking to recapture energy. An electromagnetic force of an electric motor/generator is used in regenerative braking for providing a portion of the braking torque to the vehicle to meet the braking needs of the vehicle. A control module in the brake system communicates with a powertrain control module to provide coordinated braking during regenerative braking as well as braking for wheel lock and skid conditions. For example, as the operator of the vehicle begins to brake during regenerative braking, electromagnet energy of the motor/generator will be used to apply braking torque (i.e., electromagnetic resistance for providing torque to the powertrain) to the vehicle. If it is determined that there is no longer a sufficient amount of storage means to store energy recovered from the regenerative braking or if the regenerative braking cannot meet the demands of the operator, hydraulic braking will be activated to complete all or part of the braking action demanded by the operator. Preferably, the hydraulic braking operates in a regenerative brake blending manner so that the blending is effectively and unnoticeably picked up where the electromagnetic braking left off. It is desired that the vehicle movement should have a smooth transitional change to the hydraulic braking such that the changeover goes unnoticed by the driver of the vehicle.

Some braking systems are configured such that the pressures at each of the wheel brakes can be controlled independently (referred to as a multiplexing operation) from one another even though the brake system may includes a single source of pressure. Thus, valves downstream of the pressure source are controlled between their open and closed positions to provide different braking pressures within the wheel brakes. Such multiplex systems, which are all incorporated by reference herein, are disclosed in U.S. Pat. No. 8,038,229, U.S. Patent Application Publication No. 2010/0026083, U.S.

Patent Application Publication No. 2012/0013173, and U.S. Patent Application Publication No. 2012/0306261.

SUMMARY OF THE INVENTION

This invention relates to a plunger assembly for use as a pressure source for a vehicle brake system. The plunger assembly includes a housing having first and second ports. A motor is mounted on the housing for driving an actuator. A piston is connected to the actuator. The piston is slidably mounted within the housing. The piston pressurizes a first chamber when the piston is moving in a first direction to provide fluid out of the first port. The piston pressurizes a second chamber when the piston is moving in a second direction to provide fluid out of the second port.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
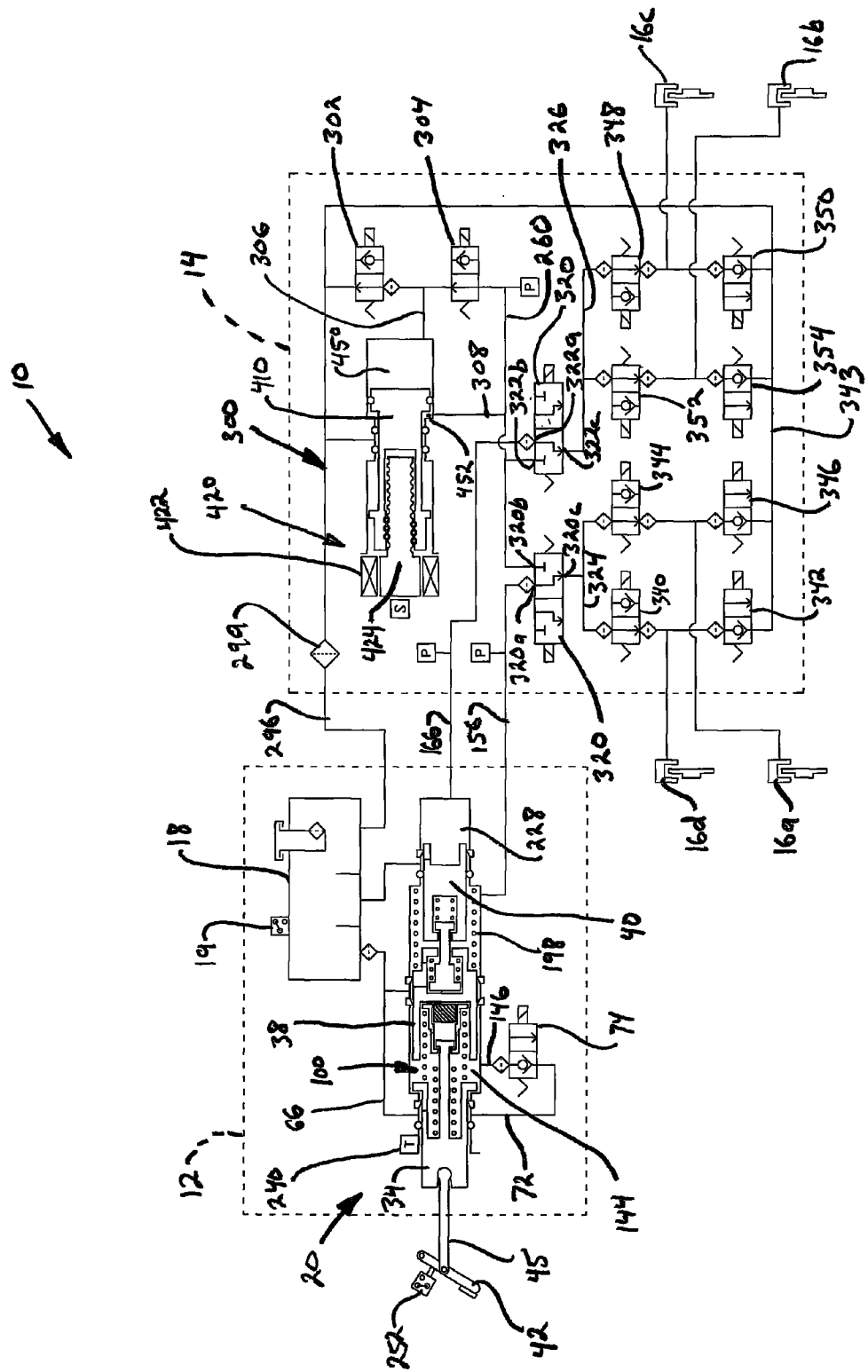
FIG. 1 is a schematic illustration of a first embodiment of a brake system.

Referring now to the drawings, there is schematically illustrated in FIG. 1 a first embodiment of a vehicle brake system, indicated generally at 10. The brake system 10 is a hydraulic boost braking system in which boosted fluid pressure is utilized to apply braking forces for the brake system 10. The brake system 10 may suitably be used on a ground vehicle such as an automotive vehicle having four wheels with a wheel brake associated with each wheel. Furthermore, the brake system 10 can be provided with other braking functions such as anti-lock braking (ABS) and other slip control features to effectively brake the vehicle, as will be discussed below.

The brake system 10 generally includes a first block or brake pedal unit assembly, indicated by broken lines 12, and a second block or hydraulic control unit, indicated by broken lines 14. The various components of the brake system 10 are housed in the brake pedal unit assembly 12 and the hydraulic control unit 14. The brake pedal unit assembly 12 and the hydraulic control unit 14 may include one or more blocks or housings made from a solid material, such as aluminum, that has been drilled, machined, or otherwise formed to house the various components. Fluid conduits may also be formed in the housings to provide fluid passageways between the various components. The housings of the brake pedal unit assembly 12 and the hydraulic control unit 14 may be single structures or may be made of two or more parts assembled together. As schematically shown, the hydraulic control unit 14 is located remotely from the brake pedal unit assembly 12 with hydraulic lines hydraulically coupling the brake pedal unit assembly 12 and the hydraulic control unit 14. Alternatively, the brake pedal unit assembly 12 and the hydraulic control unit 14 may be housed in a single housing. It should also be understood that the grouping of components as illustrated in FIG. 1 is not intended to be limiting and any number of components may be housed in either of the housings.

The brake pedal unit assembly 12 cooperatively acts with the hydraulic control unit 14 for actuating wheel brakes 16a, 16b, 16c, and 16d. The wheel brakes 16a, 16b, 16c, and 16d can be any suitable wheel brake structure operated by the application of pressurized brake fluid. The wheel brake 16a, 16b, 16c, and 16d may include, for example, a brake caliper mounted on the vehicle to engage a frictional element (such as a brake disc) that rotates with a vehicle wheel to effect braking of the associated vehicle wheel. The wheel brakes 16a, 16b, 16c, and 16d can be associated with any combination of front and rear wheels of the vehicle in which the brake system 10 is installed. For example, for a vertically split system, the wheel brakes 16a and 16d may be associated with the wheels on the same axle. For a diagonally split brake system, the wheel brakes 16a and 16b may be associated with the front wheel brakes.

The brake pedal unit assembly 12 includes a fluid reservoir 18 for storing and holding hydraulic fluid for the brake system 10. The fluid within the reservoir 18 may be held generally at atmospheric pressure or can store the fluid at other pressures if so desired. The brake system 10 may include a fluid level sensor 19 for detecting the fluid level of the reservoir. The fluid level sensor 19 may be helpful in determining whether a leak has occurred in the system 10.

The brake pedal control unit assembly 12 includes a brake pedal unit (BPU), indicated generally at 20. The brake pedal unit 20 is also schematically shown enlarged in FIG. 2. It should be understood that the structural details of the components of the brake pedal unit 20 illustrate only one example of a brake pedal unit 20. The brake pedal unit 20 could be configured differently having different components than that shown in FIGS. 1 and 2.

The brake pedal unit 20 includes a housing 24 (shown broken away in FIG. 2) having various bores formed in for slidably receiving various cylindrical pistons and other components therein. The housing 24 may be formed as a single unit or include two or more separately formed portions coupled together. The housing 24 generally includes a first bore 26, an intermediate second bore 28, and a third bore 30. The second bore 28 has a larger diameter than the first bore 26 and the third bore 30. The brake pedal unit 20 further includes an input piston 34, a primary piston 38, and a secondary piston 40. The input piston 34 is slidably disposed in the first bore 26. The primary piston 38 is slidably disposed in the second bore 28. The secondary piston 40 is slidably disposed in the third bore 30.

Figure 2:
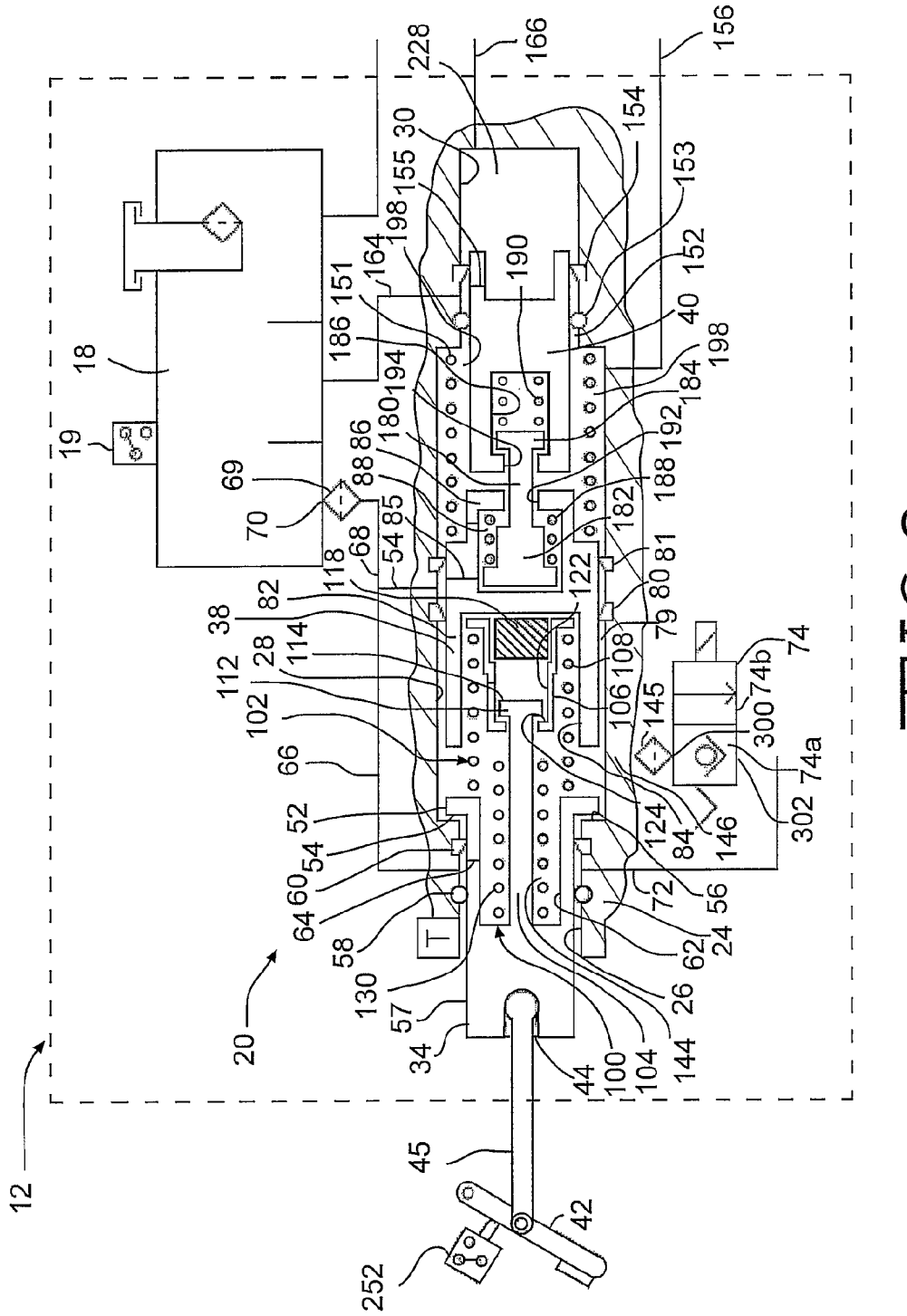
FIG. 2 is an enlarged schematic sectional view of the brake pedal unit assembly of the brake system of FIG. 1 shown in its rest position.

A brake pedal, indicated schematically at 42 in FIGS. 1 and 2, is coupled to a first end 44 of the input piston 34 via an input rod 45. The input rod 45 can be coupled directly to the input piston 34 or can be indirectly connected through a coupler (not shown). The input piston 34 includes an enlarged second end 52 that defines a shoulder 54. In the rest position shown in FIGS. 1 and 2, the shoulder 54 of the input piston engages with a shoulder 56 formed between the first and second bores 26 and 28 of the housing 24. An outer cylindrical surface 57 of the input piston 34 is engaged with a seal 58 and a lip seal 60 mounted in grooves formed in the housing 24. The outer cylindrical surface 57 may be continuous along its length or it may be stepped having two or more different diameter portions. The input piston 34 includes a central bore 62 formed through the second end 52. One or more lateral passageways 64 are formed through the input piston 34. The lateral passageways 64 extend from the outer cylindrical surface 57 to the central bore 62 to provide fluid communication therebetween. The brake pedal unit 20 is in a "rest" position as shown in FIGS. 1 and 2. In the "rest" position, the pedal 42 has not been depressed by the driver of the vehicle. In the rest position, the passageways 64 of the input piston 34 are between the seals 58 and 60. In this position, the passageways 64 are in fluid communication with a conduit 66 formed though the housing 24. The conduit 66 is in fluid communication with a conduit 68 formed in the housing 24. The conduit 68 is in fluid communication with a reservoir port 70 connected to the reservoir 18. A filter 69 may be disposed in the port 70 or the conduit 68. The conduits 66 and 68 can be formed by various bores, grooves and passageways formed in the housing 24. In the rest position, the passageways 64 are also in fluid communication with a conduit 72 formed in the housing 24 which leads to a simulation valve 74. The simulation valve 74 may be a cut off valve which may be electrically operated. The simulation valve 74 may be mounted in the housing 24 or may be remotely located therefrom The primary piston 38 is slidably disposed in the second bore 28 of the housing 24. An outer wall 79 of the primary piston 38 is engaged with a lip seal 80 and a lip seal 81 mounted in grooves formed in the housing 24. The primary piston 38 includes a first end 82 having a cavity 84 formed therein. A second end 86 of the primary piston 38 includes a cavity 88 formed therein. One or more passageways 85 are formed in the primary piston 38 which extend from the cavity 88 to the outer wall of the primary piston 38. As shown in FIG. 2, the passageway 85 is located between the lip seals 80 and 81 when the primary piston 38 is in its rest position. For reasons which will be explained below, the passageway 85 is in selective fluid communication with a conduit 154 which is in fluid communication with the reservoir 18.

The central bore 62 of the input piston 34 and the cavity 84 of the primary piston 38 house various components defining a pedal simulator, indicated generally at 100. A caged spring assembly, indicated generally at 102, is defined by a pin 104, a retainer 106, and a low rate simulator spring 108. The pin 104 is shown schematically as being part of the input piston 34 and disposed in the central bore 62. The pin 104 could be configured as a pin having a first end which is press fit or threadably engaged with the input piston 34. The pin 104 extends axially within the central bore 62 and into the cavity 84 of the primary piston 38. A second end 112 of the pin 104 includes a circular flange 114 extending radially outwardly therefrom. The second end 112 is spaced from an elastomeric pad 118 disposed in the cavity 84. The elastomeric pad 118 is axially aligned with the second end 112 of the pin 104, the reason for which will be explained below. The retainer 106 of the caged spring assembly 102 includes a stepped through bore 122. The stepped through bore 122 defines a shoulder 124. The second end 112 of the pin 104 extends through the through bore 122. The flange 114 of the pin 104 engages with the shoulder 124 of the retainer 106 to prevent the pin 104 and the retainer 106 from separating from each other. One end of the low rate simulator spring 108 engages with the second end 52 of the input piston 34, and the other end of the low rate simulator spring 108 engages with the retainer 106 to bias the retainer 106 in a direction away from the pin 104.

The pedal simulator 100 further includes a high rate simulator spring 130 which is disposed about the pin 104. The terms low rate and high rate are used for description purposes and are not intended to be limiting. It should be understood that that the various springs of the pedal simulator 100 may have any suitable spring coefficient or spring rate. In the illustrated embodiment, the high rate simulator spring 130 preferably has a higher spring rate than the low rate simulator spring 108. One end of the high rate simulator spring 130 engages with the bottom of the central bore 62 of the input piston 34. The other end of the high rate simulator spring 130 is shown in FIG. 2 in a non-engaged position and spaced away from an end of the retainer 106. The housing 24, the input piston 34 (and its seals), and the primary piston 38 (and its seals) generally define a fluid simulation chamber 144. The simulation chamber 144 is in fluid communication with a conduit 146 which is in fluid communication with the simulation valve 74. A filter 145 may be housed within the conduit 146.

As discussed above, the brake pedal unit 20 includes the primary and secondary pistons 38 and 40 that are disposed in the second and third bores 28 and 32, respectively, which are formed in the housing 24. The primary and secondary pistons 38 and 40 are generally coaxial with one another. A primary output conduit 156 is formed in the housing 24 and is in fluid communication with the second bore 28. The primary output conduit 156 may be extended via external piping or a hose connected to the housing 24. A secondary output conduit 166 is formed in the housing 24 and is in fluid communication with the third bore 30. The secondary output conduit 166 may be extended via external piping or a hose connected to the housing 24. As will be discussed in detail below, rightward movement of the primary and secondary pistons 38 and 40, as viewing FIGS. 1 and 2, provides pressurized fluid out through the conduits 156 and 166, respectively. A return spring 151 is housed in the second bore 28 and biases the primary piston 38 in the leftward direction.

The secondary piston 40 is slidably disposed in the third bore 30. An outer wall 152 of the secondary piston is engaged with a lip seal 153 and a lip seal 154 mounted in grooves formed in the housing 24. A secondary pressure chamber 228 is generally defined by the third bore 30, the secondary piston 40, and the lip seal 154. Rightward movement of the secondary piston 40, as viewing FIGS. 1 and 2, causes a buildup of pressure in the secondary pressure chamber 228. The secondary pressure chamber 228 is in fluid communication with the secondary output conduit 166 such that pressurized fluid is selectively provided to the hydraulic control unit 14. One or more passageways 155 are formed in the secondary piston 40. The passageway 155 extends between the outer wall of the primary piston 38 and a right-hand end of the secondary piston 40. As shown in FIG. 2, the passageway 155 is located between the seal 153 and the lip seal 154 when the secondary piston 40 is in its rest position, the reason for which will be explained below. For reasons which will be explained below, the passageway 155 is in selective fluid communication with a conduit 164 which is in fluid communication with the reservoir 18.

A primary pressure chamber 198 is generally defined by the second bore 28, the primary piston 38, the secondary piston 40, the lip seal 81, and the seal 153. Although the various seals shown in the drawings are schematically represented as O-ring or lip seals, it should be understood that they can have any configuration. Rightward movement of the primary piston 38, as viewing FIGS. 1 and 2, causes a buildup of pressure in the primary pressure chamber 198. The primary pressure chamber 198 is in fluid communication with the primary output conduit 156 such that pressurized fluid is selectively provided to the hydraulic control unit 14.

The primary and secondary pistons 38 and 40 may be mechanically connected together such that there is limited play or movement between the pistons 38 and 40. This type of connection permits the primary and secondary pistons 38 and 40 to move relative to one another by relatively small increments to compensate for pressure and/or volume differences in their respective output circuits. However, under certain failure modes it is desirable that the secondary piston 40 is connected to the primary piston 38. For example, if the brake system 10 is under a manual push through mode, as will be explained in detail below, and additionally fluid pressure is lost in the output circuit relative to the secondary piston 40, such as for example, in the conduit 166, the secondary piston 40 will be forced or biased in the rightward direction due to the pressure within the primary chamber 1798. If the primary and secondary pistons 38 and 40 were not connected together, the secondary piston 40 would freely travel to its further most right-hand position, as viewing FIGS. 1 and 2, and the driver would have to depress the pedal 42 a distance to compensate for this loss in travel. However, because the primary and secondary pistons 38 and 40 are connected together, the secondary piston 40 is prevented from this movement and relatively little loss of travel occurs in this type of failure.

The primary and secondary pistons 38 and 40 can be connected together by any suitable manner. For example, as schematically shown in FIGS. 1 and 2, a locking member 180 is disposed and trapped between the primary and secondary pistons 38 and 40. The locking member 180 includes a first end 182 and a second end 184. The first end 182 is trapped within the cavity 88 of the second end 86 of the primary piston 38. The second end 184 of the locking member 180 is trapped within a recess or cavity 186 formed in the secondary piston 40. The first and second ends 182 and 184 may include enlarged head portions which are trapped behind narrower openings 192 and 194 of the cavities 88 and 186, respectively. A first spring 188 is housed within the cavity 88 of the primary piston 38 and biases the locking member 180 in a direction towards the primary piston 38 and away from the secondary piston 40. A second spring 190 is housed within the cavity 186 of the secondary piston 40 and biases the locking member 180 in a direction towards the primary piston 38 and away from the secondary piston 40. The springs 188 and 190 and the locking member 180 maintain the first and second output piston at a spaced apart distance from one another while permitting limited movement towards and away from each other by compression of the springs 188 or 190. This limited play mechanical connection permits the primary and secondary pistons 38 and 40 to move relative to one another by small increments to compensate for pressure and/or volume differences in their respective output circuits.

Referring back to FIG. 1, the system 10 may further include a travel sensor, schematically shown at 240 in FIG. 1, for producing a signal that is indicative of the length of travel of the input piston 34 which is indicative of the pedal travel. The system 10 may also include a switch 252 for producing a signal for actuation of a brake light and to provide a signal indicative of movement of the input piston 34. The brake system 10 may further include sensors such as pressure transducers 257 and 259 for monitoring the pressure in the conduits 156 and 166, respectively.

The system 10 further includes a source of pressure in the form of a plunger assembly, indicated generally at 300. As will be explained in detail below, the system 10 uses the plunger assembly 300 to provide a desired pressure level to the wheel brakes 16*a-d* during a normal boosted brake apply. Fluid from the wheel brakes 16*a-d* may be returned to the plunger assembly 300 or diverted to the reservoir 18.

The system 10 further includes a first isolation valve 320 and a second isolation valve 322 (or referred to as switching valves or base brake valves). The isolation valves 320 and 322 may be solenoid actuated three way valves. The isolation valves 320 and 322 are generally operable to two positions, as schematically shown in FIG. 1. The first isolation valve 320 has a port 320*a* in selective fluid communication with the primary output conduit 156 which is in fluid communication with the first output pressure chamber 198. A port 320*b* is in selective fluid communication with a boost conduit 260. A port 320*c* is in fluid communication with a conduit 324 which is selectively in fluid communication with the wheel brakes 16*a* and 16*d*. The second isolation valve 322 has a port 322*a* in selective fluid communication with the conduit 166 which is in fluid communication with the second output pressure chamber 228. A port 322*b* is in selective fluid communication with the boost conduit 260. A port 322*c* is in fluid communication with a conduit 326 which is selectively in fluid communication with the wheel brakes 16*b* and 16*c*.

The system 10 further includes various valves (slip control valve arrangement) for permitting controlled braking operations, such as ABS, traction control, vehicle stability control, and regenerative braking blending. A first set of valves includes an apply valve 340 and a dump valve 342 in fluid communication with the conduit 324 for cooperatively supplying brake fluid received from the boost valves to the wheel brake 16*d*, and for cooperatively relieving pressurized brake fluid from the wheel brake 16*d* to a reservoir conduit 343 in fluid communication with the reservoir conduit 296. A second set of valves include an apply valve 344 and a dump valve 346 in fluid communication with the conduit 324 for cooperatively supplying brake fluid received from the boost valves to the wheel brake 16*a*, and for cooperatively relieving pressurized brake fluid from the wheel brake 16*a* to the reservoir conduit 343. A third set of valves include an apply valve 348 and a dump valve 350 in fluid communication with the conduit 326 for cooperatively supplying brake fluid received from the boost valves to the wheel brake 16*c*, and for cooperatively relieving pressurized brake fluid from the wheel brake 16*c* to the reservoir conduit 343. A fourth set of valves include an apply valve 352 and a dump valve 354 in fluid communication with the conduit 326 for cooperatively supplying brake fluid received from the boost valves to the wheel brake 16*d*, and for cooperatively relieving pressurized brake fluid from the wheel brake 16*d* to the reservoir conduit 343.

As stated above, the system 10 includes a source of pressure in the form of the plunger assembly 300 to provide a desired pressure level to the wheel brakes 16*a-d*. The system 10 further includes a venting valve 302 and a pumping valve 304 which cooperate with the plunger assembly 300 to provide boost pressure to the boost conduit 260 for actuation of the wheel brakes 16*a-d*. The venting valve 302 and the pumping valve 304 may be solenoid actuated valves movable between open positions and closed positions. In the closed positions, the venting valve 302 and the pumping valve 304 may still permit flow in one direction as schematically shown as a check valve in FIG. 1. The venting valve 302 is in fluid communication with the reservoir conduit 296 and a first output conduit 306 in fluid communication with the plunger assembly 300. A second output conduit 308 is in fluid communication between the plunger assembly 300 and the boost conduit 260.

Figure 3:
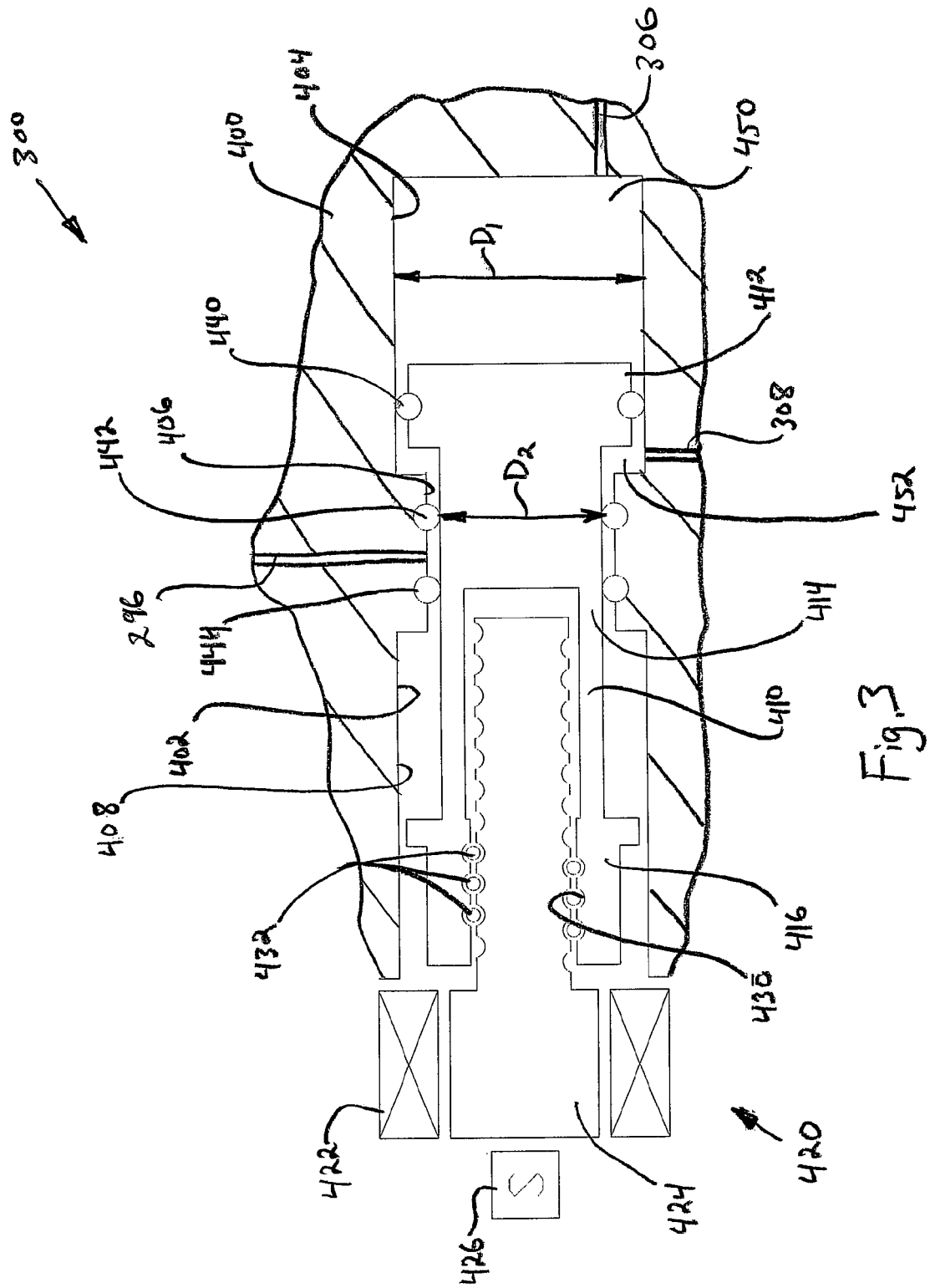
FIG. 3 is an enlarged schematic sectional view of the plunger assembly of the brake system of FIG. 1 shown in a rest position.

As best shown in FIG. 3, the plunger assembly 300 includes a housing 400 having a multi-stepped bore 402 formed therein. The bore 402 includes a first portion 404, a second portion 406, and third portion 408. A piston 410 is slidably disposed with the bore 402. The piston 410 includes an enlarged end portion 412 connected to a smaller diameter central portion 414. The piston 410 has a second end 416 connected to a ball screw mechanism, indicated generally at 420. The ball screw mechanism 420 is provided to impart translational or linear motion of the piston 410 along an axis defined by the bore 402 in both a forward direction (rightward as viewing FIGS. 1 and 3), and a rearward direction (leftward as viewing FIGS. 1 and 3) within the bore 402 of the housing 400. In the embodiment shown, the ball screw mechanism 420 includes a motor 422 rotatably driving a screw shaft 424. The motor 422 may include a sensor 426 for detecting the rotational position of the motor 422 and/or ball screw mechanism 420 which is indicative of the position of the piston 410. The second end 416 of the piston 410 includes a threaded bore 430 and functions as a driven nut of the ball screw mechanism 420. The ball screw mechanism 420 includes a plurality of balls 432 that are retained within helical raceways formed in the screw shaft 424 and the threaded bore 430 of the piston 410 to reduce friction. Although a ball screw mechanism 420 is shown and described with respect to the plunger assembly 300, it should be understood that other suitable mechanical linear actuators may be used for imparting movement of the piston 410. It should also be understood that although the piston 410 functions as the nut of the ball screw mechanism 420, the piston 410 could be configured to function as a screw shaft of the ball screw mechanism 420. Of course, under this circumstance, the screw shaft 424 would be configured to function as a nut having internal helical raceways formed therein.

As will be discussed in detail below, the plunger assembly 300 can provide boosted pressure to the boost conduit 260 when actuated in both the forward and rearward directions. The plunger assembly 300 includes a seal 440 mounted on the enlarged end portion 412 of the piston 410. The seal 440 slidably engages with the inner cylindrical surface of the first portion 404 of the bore 2 as the piston 410 moves within the bore 402. A pair of seals 442 and 444 is mounted in grooves formed in the second portion 406 of the bore 402. The seals 442 and 444 slidably engage with the outer cylindrical surface of the central portion 414 of the piston 410. A first pressure chamber 450 is generally defined by the first portion 404 of the bore 402, the enlarged end portion 412 of the piston 410, and the seal 440. A second pressure chamber 452, located generally behind the enlarged end portion 412 of the piston 410, is generally defined by the first and second portions 404 and 406 of the bore 402, the seals 442 and 444, and the central portion 414 of the piston 410. The seals 440, 442, and 44 can have any suitable seal structure. In one embodiment, the seal 440 is a quad ring seal. Although a lip seal may also be suitable for the seal 440, a lip seal is more generally more compliant and requires more volume displacement for a given pressure differential. This may result in a small boost pressure reduction when the piston 410 travels in the rearward direction during a pumping mode.

As stated above, the brake pedal unit assembly 12 includes a simulation valve 74 which may be mounted in the housing 24 or remotely from the housing 24. As schematically shown in FIGS. 1 and 2, the simulation valve 74 may be a solenoid actuated valve. The simulation valve 74 includes a first port 75 and a second port 77. The port 75 is in fluid communication with the conduit 146 which is in fluid communication with the simulation chamber 144. The port 77 is in fluid communication with the conduit 72 which is in fluid communication with the reservoir 18 via the conduits 66 and 68. The simulation valve 74 is movable between a first position 74a restricting the flow of fluid from the simulation chamber 144 to the reservoir 18, and a second position 74b permitting the flow of fluid between the reservoir 18 and the simulation chamber 144. The simulation valve 74 is in the first position or normally closed position when not actuated such that fluid is prevented from flowing out of the simulation chamber 144 through conduit 72, as will be explained in detail below.

The following is a description of the operation of the brake system 10. FIGS. 1 and 2 illustrate the brake system 10 and the brake pedal unit 20 in the rest position. In this condition, the driver is not depressing the brake pedal 42. Also in the rest condition, the simulation valve 74 may be energized or not energized. During a typical braking condition, the brake pedal 42 is depressed by the driver of the vehicle. The brake pedal 42 is coupled to the travel sensor 240 for producing a signal that is indicative of the length of travel of the input piston 34 and providing the signal to an electronic control module (not shown). The control module may include a microprocessor. The control module receives various signals, processes signals, and controls the operation of various electrical components of the brake system 10 in response to the received signals. The control module can be connected to various sensors such as pressure sensors, travel sensors, switches, wheel speed sensors, and steering angle sensors. The control module may also be connected to an external module (not shown) for receiving information related to yaw rate, lateral acceleration, longitudinal acceleration of the vehicle such as for controlling the brake system 10 during vehicle stability operation. Additionally, the control module may be connected to the instrument cluster for collecting and supplying information related to warning indicators such as ABS warning light, brake fluid level warning light, and traction control/vehicle stability control indicator light.

During normal braking operations (normal boost apply braking operation) the plunger assembly 300 is operated to provide boost pressure to the boost conduit 260 for actuation of the wheel brakes 16a-d. Under certain driving conditions, the control module communicates with a powertrain control module (not shown) and other additional braking controllers of the vehicle to provide coordinated braking during advanced braking control schemes (e.g., anti-lock braking (AB), traction control (TC), vehicle stability control (VSC), and regenerative brake blending). During a normal boost apply braking operation, the flow of pressurized fluid from the brake pedal unit 20 generated by depression of the brake pedal 42 is diverted into the internal pedal simulator assembly 100. The simulation valve 74 is actuated to divert fluid through the simulation valve 74 from the simulation chamber 144 to the reservoir 18 via the conduits 146, 72, 66, and 68. Note that fluid flow from the simulation chamber 144 to the reservoir 18 is closed off once the passageways 64 in the input piston 34 move past the seal 60. Prior to movement of the input piston 34, as shown in FIGS. 1 and 2, the simulation chamber 144 is in fluid communication with the reservoir 18 via the conduits 66 and 68.

During the duration of the normal braking mode, the simulation valve 74 remains open permitting the fluid to flow from the simulation chamber 144 to the reservoir 18. The fluid within the simulation chamber 144 is non-pressurized and is under very low pressures, such as atmospheric or low reservoir pressure. This non-pressurized configuration has an advantage of not subjecting the sealing surfaces of the pedal simulator to large frictional forces from seals acting against surfaces due to high pressure fluid. In conventional pedal simulators, the piston(s) are under increasingly high pressures as the brake pedal is depressed subjecting them large frictional forces from the seals, thereby adversely effecting the pedal feel.

Also during the normal boost apply braking operation, the isolation valves 320 and 322 are energized to a secondary position to prevent the flow of fluid from the conduits 156 and 166 through the valves 320 and 322. Fluid flow is prevented from flowing from the ports 320a and 322a to the ports 320c and 322c, respectively. Thus, the fluid within the first and second output pressure chambers 198 and 228 of the brake pressure unit 20 are fluidly locked which generally prevents the first and second output pistons 38 and 40 from moving further. More specifically, during the initial stage of the normal boost apply braking operation, movement of the input rod 45 causes movement of the input piston 34 in a rightward direction, as viewing FIG. 2. Initial movement of the input piston 34 causes movement of the primary piston 38 via the low rate simulator spring 108. Movement of the primary piston 38 causes initial movement of the secondary piston 40 due to the mechanical connection therebetween by the locking member 180 and the springs 188 and 190. Note that during this initial movement of the primary piston 38, fluid is free to flow from the primary pressure chamber 198 to the reservoir 18 via conduits 85, 154, and 68 until the conduit 85 moves past the seal 81. Also, during initial movement of the secondary piston 40, fluid is free to flow from the secondary pressure chamber 228 to the reservoir 18 via the conduits 155 and 164 until the conduit 155 moves past the seal 154.

After the primary and secondary pistons 38 and 40 stop moving (by closing of the conduits 85 and 155 and closing of the first and second base brake valves 320 and 322), the input piston 34 continues to move rightward, as viewing FIGS. 1 and 2, upon further movement by the driver depressing the brake pedal 42. Further movement of the input piston 34 compresses the various springs of the pedal simulator assembly 100, thereby providing a feedback force to the driver of the vehicle.

During normal braking operations (normal boost apply braking operation) while the pedal simulator assembly 100 is being actuated by depression of the brake pedal 42, the plunger assembly 300 can be actuated by the electronic control unit to provide actuation of the wheel brakes 16a-d. Actuation of the isolation valves 320 and 322 to their secondary positions to prevent the flow of fluid from the conduits 156 and 166 through the valves 320 and 322 isolates the brake pedal unit 20 from the wheel brakes 16a-d. The plunger assembly 300 may provide "boosted" or higher pressure levels to the wheel brakes 16a-d compared to the pressure generated by the brake pedal unit 20 by the driver depressing the brake pedal 42. Thus, the system 10 provides for assisted braking in which boosted pressure is supplied to the wheel brakes 16a-d during a normal boost apply braking operation helping reduce the force required by the driver acting on the brake pedal 42.

To actuate the wheel brakes 16a-d via the plunger assembly 300 when in its rest position, as shown in FIGS. 1 and 3, the electronic control unit energizes the venting valve 302 to its closed position, as shown in FIG. 1, such that fluid is prevented from venting to reservoir by flowing from the conduit 306 to the conduit 296. The pumping valve 304 is de-energized to its open position, as shown in FIG. 1, to permit flow of fluid through the pumping valve 304. The electronic control unit actuates the motor 422 in a first rotational direction to rotate the screw shaft 424 in the first rotational direction. Rotation of the screw shaft 424 in the first rotational direction causes the piston 410 to advance in the forward direction (rightward as viewing FIGS. 1 and 3). Movement of the piston 410 causes a pressure increase in the first pressure chamber 450 and fluid to flow out of the first pressure chamber 450 and into the conduit 306. Fluid can flow into the boost conduit 260 via the open pumping valve 304. Note that fluid is permitted to flow into the second pressure chamber 452 via the conduit 308 as the piston 410 advances in the forward direction. Pressurized fluid from the boost conduit 260 is directed into the conduits 324 and 326 through the isolation valves 320 and 322. The pressurized fluid from the conduits 324 and 326 can be directed to the wheel brakes 16a-d through opened apply valves 340, 344, 348, and 352 while the dump valves 342, 346, 350, and 354 remain closed. When the driver releases the brake pedal 42, the pressurized fluid from the wheel brakes 16a-d may back drive the ball screw mechanism 420 moving the piston 410 back to its rest position. Under certain circumstances, it may also be desirable to actuate the motor 422 of the plunger assembly 300 to retract the piston 410 withdrawing the fluid from the wheel brakes 16a-d. During a forward stroke of the plunger assembly 300, the pumping valve 304 may be in its open position or held closed During a braking event, the electronic control module can also selectively actuate the apply valves 340, 344, 348, and 352 and the dump valves 342, 346, 350, and 354 to provide a desired pressure level to the wheel brakes 16d, 16a, 16c, and 16b, respectively.

In some situations, the piston 410 of the plunger assembly 300 may reach its full stroke length within the bore 402 of the housing 400 and additional boosted pressure is still desired to be delivered to the wheel brakes 16-d. The plunger assembly 300 is a dual acting plunger assembly such that it is configured to also provide boosted pressure to the boost conduit 260 when the piston 410 is stroked rearwardly. This has the advantage over a conventional plunger assembly that first requires its piston to be brought back to its rest or retracted position before it can again advance the piston to create pressure within a single pressure chamber. If the piston 410 has reached its full stroke, for example, and additional boosted pressure is still desired, the pumping valve 304 is energized to its closed check valve position. The venting valve 302 may be de-energized to its open position. Alternatively, the venting valve 302 may be left energized in its closed to permit fluid flow through its check valve during a pumping mode. The electronic control unit actuates the motor 422 in a second rotational direction opposite the first rotational direction to rotate the screw shaft 424 in the second rotational direction. Rotation of the screw shaft 424 in the second rotational direction causes the piston 410 to retract or move in the rearward direction (leftward as viewing FIGS. 1 and 3). Movement of the piston 410 causes a pressure increase in the second pressure chamber 452 and fluid to flow out of the second pressure chamber 452 and into the conduit 308. Note that fluid is permitted to flow into the first pressure chamber 450 via the conduits 306 and 296 as the piston 410 moves rearwardly or in its return stroke. Pressurized fluid from the boost conduit 260 is directed into the conduits 324 and 326 through the isolation valves 320 and 322. The pressurized fluid from the conduits 324 and 326 can be directed to the wheel brakes 16a-d through the opened apply valves 340, 344, 348, and 352 while dump valves 342, 346, 350, and 354 remain closed. In a similar manner as during a forward stroke of the piston 410, the electronic control module can also selectively actuate the apply valves 340, 344, 348, and 352 and the dump valves 342, 346, 350, and 354 to provide a desired pressure level to the wheel brakes 16d, 16a, 16c, and 16b, respectively.

As shown in FIG. 3, the first portion 404 of the bore 402 generally has a fluid diameter $D_1$ corresponding to where the outer diameter of the seal 440 slides along the inner cylindrical surface of the first portion 404 of the bore 402. The second portion 406 of the bore 402 generally has a fluid diameter $D_2$ corresponding to inner diameter of the seal 442 sliding against the outer diameter of the central portion 414 of the piston 410. The first pressure chamber 450 generally has an effective hydraulic area corresponding to the diameter $D_2$ since fluid is diverted through the conduits 306, 260, and 308 as the piston 410 is advanced in the forward direction. The second pressure chamber 452 has an effective hydraulic area corresponding to the diameter $D_1$ minus the diameter $D_2$. The plunger assembly 300 can be configured to have any suitable dimensions for the diameters $D_1$ and $D_2$. In one embodiment, the diameters $D_1$ and $D_2$ can be configured such that the effective area defined by $D_1$ can be greater than the annular effective area defined by $D_1$ and $D_2$. This configuration provides that on the back stroke in which the piston is moving rearwardly, less torque (or power) is required by the motor 422 to maintain the same pressure as in its forward stroke. Besides using less power, the motor 422 may also generate less heat during the rearward stroke of piston 410. Under circumstances in which the driver presses on the pedal 42 for long durations, the plunger assembly 300 could be operated to apply a rearward stroke of the piston 410 to prevent overheating of the motor 422. Note that the chamber 450 should be sized larger than the chamber 452.

Instead of using the apply valves 340, 344, 348, and 352 and the dump valves 342, 346, 350, and 354 to provide a desired pressure level to the wheel brakes 16d, 16a, 16c, and 16b, the system 10 could replace the apply and dump valves with single control valves (not shown) in the conduits corresponding to the wheel brakes 16a-d. The control valves can be actuated individually, in a multiplexing manner, between their open and closed positions to provide different braking pressures within the wheel brakes 16a-d. This may be used during various braking functions such as anti-lock braking, traction control, dynamic rear proportioning, vehicle stability control, hill hold, and regenerative braking Pressurized fluid is returned from the wheel brakes 16a-d to the plunger assembly 300 through the control valves instead of being diverted to the reservoir. In this situation, the plunger assembly 300 is preferably configured and operated by the electronic control unit (not shown) such that relatively small rotational increments of the motor 422 and/or ball screw mechanism 420 are obtainable. Thus, small volumes of fluid and relatively minute pressure levels are able to be applied and removed from the conduits associated with the wheel brakes 16a-d. For example, the motor 422 may be actuated to turn 0.5 of a degree to provide a relatively small amount of fluid and pressure increase. This enables a multiplexing arrangement such that the plunger assembly 300 can be controlled to provide individual wheel pressure control. Thus, the plunger assembly 300 and the system 10 can be operated to provide individual control for the wheel brakes 16a-d or can be used to control one or more wheel brakes 16a-d simultaneously by opening and closing the appropriate control valves (not shown).

In the event of a loss of electrical power to portions of the brake system 10, the brake system 10 provides for manual push through or manual apply such that the brake pedal unit 20 can supply relatively high pressure fluid to the primary output conduit 156 and the secondary output conduit 166. During an electrical failure, the motor 422 of the plunger assembly 300 might cease to operate, thereby failing to produce pressurized hydraulic brake fluid from the plunger assembly 300. The isolation valves 320 and 324 will shuttle (or remain) in their positions to permit fluid flow from the conduits 156 and 166 to the wheel brakes 16a-d. The simulation valve 74 is shuttled to its closed position 74a, as shown in FIGS. 1 and 2, to prevent fluid from flowing out of the simulation chamber 144 to the reservoir 18. Thus, moving the simulation valve 74 to its closed position 74a hydraulically locks the simulation chamber 144 trapping fluid therein. During the manual push-through apply, the primary and secondary output pistons 38 and 40 will advance rightward pressurizing the chambers 198 and 228, respectively. Fluid flows from the chambers 198 and 228 into the conduits 156 and 166, respectively, to actuate the wheel brakes 16a-d as described above.

During the manual push-through apply, initial movement of the input piston 34 forces the spring(s) of the pedal simulator to start moving the pistons 38 and 40. After further movement of the input piston 34, in which the fluid within the simulation chamber 144 is trapped or hydraulically locked, further movement of the input piston 34 pressurizes the simulation chamber 144 causing movement of the primary piston 38 which also causes movement of the secondary piston 40 due to pressurizing of the primary chamber 144. As shown in FIGS. 1 and 2, the input piston 34 has a smaller diameter (about the seal 60) than the diameter of the primary piston 38 (about the seal 80). Since the hydraulic effective area of the input piston 34 is less than the hydraulic effective area of the primary piston 38, the input piston 34 may travel more axially in the right-hand direction as viewing FIGS. 1 and 2 than the primary piston 38. An advantage of this configuration is that although a reduced diameter effective area of the input piston 34 compared to the larger diameter effective area of the primary piston 38 requires further travel, the force input by the driver's foot is reduced. Thus, less force is required by the driver acting on the brake pedal 42 to pressurize the wheel brakes compared to a system in which the input piston and the primary piston have equal diameters.

In another example of a failed condition of the brake system 10, the hydraulic control unit 12 may fail as discussed above and furthermore one of the output pressure chambers 198 and 228 may be reduced to zero or reservoir pressure, such as failure of a seal or a leak in one of the conduits 156 or 166. The mechanical connection of the primary and secondary pistons 38 and 40 prevents a large gap or distance between the pistons 38 and 40 and prevents having to advance the pistons 38 and 40 over a relatively large distance without any increase in pressure in the non-failed circuit. For example, if the brake system 10 is under a manual push through mode and additionally fluid pressure is lost in the output circuit relative to the secondary piston 40, such as for example in the conduit 166, the secondary piston 40 will be forced or biased in the rightward direction due to the pressure within the primary chamber 198. If the primary and secondary pistons 38 and 40 were not connected together, the secondary piston 40 would freely travel to its further most right-hand position, as viewing FIGS. 1 and 2, and the driver would have to depress the pedal 42 a distance to compensate for this loss in travel. However, because the primary and secondary pistons 38 and 40 are connected together through the locking member 180, the secondary piston 40 is prevented from this movement and relatively little loss of travel occurs in this type of failure. Thus, the maximum volume of the primary pressure chamber 198 is limited had the secondary piston 40 not be connected to the primary piston 38.

In another example, if the brake system 10 is under a manual push through mode and additionally fluid pressure is lost in the output circuit relative to the primary piston 40, such as for example, in the conduit 156, the secondary piston 40 will be forced or biased in the leftward direction due to the pressure within the secondary chamber 228. Due to the configuration of the brake pedal unit 20, the left-hand end of the secondary piston 40 is relatively close to the right-hand end of the primary piston 38. Thus, movement of the secondary piston 40 towards the primary piston 38 during this loss of pressure is reduced compared to a conventional master cylinder in which the primary and secondary pistons have equal diameters and are slidably disposed in the same diameter bore. To accomplish this advantage, the housing 24 of the brake pedal unit 20 includes a stepped bore arrangement such that diameter of the second bore 28 which houses the primary piston 38 is larger than the third bore 30 housing the secondary piston 40. A portion of the primary chamber 198 includes an annular region surrounding a left-hand portion of the secondary piston 40 such that the primary and secondary pistons 38 and 40 can remain relatively close to one another during a manual push-through operation. In the configuration shown, the primary and secondary pistons 38 and 40 travel together during a manual push-through operation in which both of the circuits corresponding to the conduits 156 and 166 are intact. This same travel speed is due to the hydraulic effective areas of the pistons 38 and 40, for their respective output pressure chambers 198 and 228, are approximately equal. In a preferred embodiment, the area of the diameter of the secondary piston 40 is approximately equal to the area of the diameter of the primary piston 38 minus the area of the diameter of the secondary piston 40. Of course, the brake pedal unit 20 could be configured differently such that the primary and secondary pistons 38 and 40 travel at different speeds and distances during a manual push though operation.

During a manual push-through operation in which both of the circuits corresponding to the conduits 156 and 166 are intact, such as during an electrical failure described above, the combined hydraulic effective area of the primary and secondary pistons 38 and 40 is the area of the diameter of the primary piston 38. However, during a failure of one of the circuits corresponding to the conduits 156 and 166, such as by a leak in the conduit 166, the hydraulic effective area is halved such that the driver can now generate double the pressure within the primary chamber 198 and the non-failed conduit 156 when advancing the primary piston 38 during a manual push-through operation via depression of the brake pedal 42. Thus, even though the driver is actuating only two of the wheel brakes 16a and 16d during this manual push through operation, a greater pressure is obtainable in the non-failed primary chamber 198. Of course, the stroke length of the primary piston 38 will need to be increased to compensate.

Figure 4:
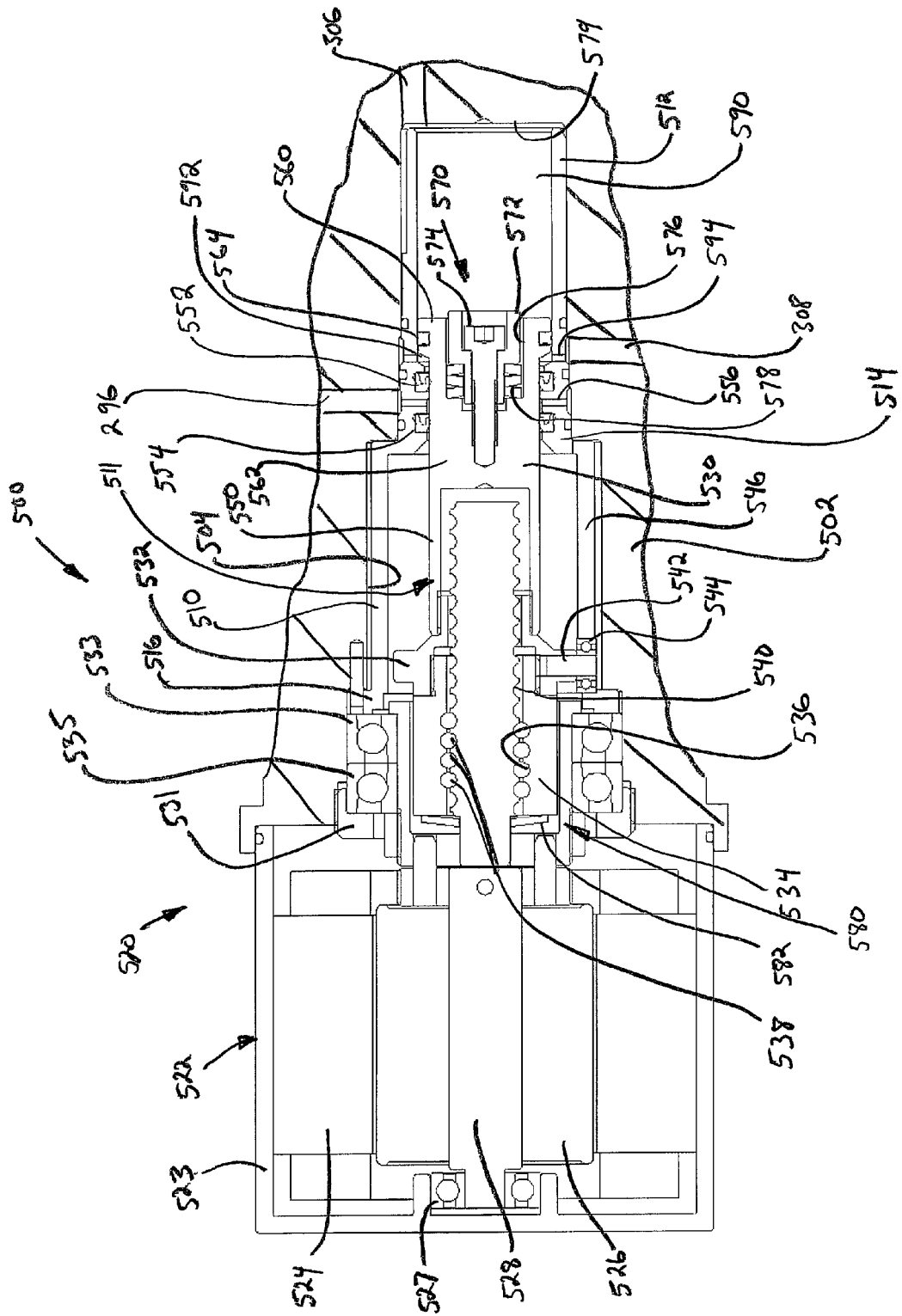
FIG. 4 is an alternate embodiment of a plunger assembly which may be used in the brake system of FIG. 1.

There is illustrated in FIG. 4 an alternate embodiment of a plunger assembly, indicated generally at 500, which may be used for the plunger assembly 300 in the brake system 10, for example. The plunger assembly 500 includes a housing 502 having a multi-stepped bore 504 formed therein. If installed into the system 10, the conduits 296, 306, and 308 are in fluid communication with the bore 504. A hollow sleeve 510 may be inserted into the bore 504. Although the components of the plunger assembly 500 may be made of any suitable material, the housing 502 may be made of aluminum for weight reduction while the sleeve 510 may be made of a hard coat anodized metal for accepting a piston assembly 511 slidably disposed therein. The sleeve 510 has a multi-stepped inner bore including a first portion 512, a second portion 514, and a third portion 516 (similar to the first portion 404, the second portion 406, and the third portion 408 of the bore 402 of the plunger assembly 300).

The plunger assembly 500 further includes a ball screw mechanism, indicated generally at 520. The ball screw mechanism 520 includes a motor 522 having an outer housing 523 which houses a stator 524 for rotating a rotor 526. The rotor 526 rotates a screw shaft 528 extending along the axis of the plunger assembly 500. A rear end of the rotor 526 is supported in the housing 523 by a bearing assembly 527. The front end of the rotor 526 is connected to a multi-piece support assembly 531 which is supported by a pair of bearing assemblies 533 and 535 mounted in the bore 504 of the housing 502. The bearing assemblies 527, 533, and 535 are shown as ball bearing assemblies having upper and lower races. However, it should be understood that the bearings assemblies 531, 533, and 535 can be any suitable structure.

The piston assembly 511 includes a piston 530 threadably attached to an intermediate connector 532 which is threadably attached to a nut 534. The nut 534 includes an internal threaded bore 536 having helical raceways formed therein for retaining a plurality of balls 538. The balls 538 are also retained in raceways 540 formed in the outer surface of the screw shaft 528, thereby functioning as a ball screw drive mechanism. To prevent rotation of the piston assembly 511, the plunger 500 can include an anti-rotation device including a pin 542 extending radially outwardly from the intermediate connector 532. A bearing assembly 544 is attached to the pin 542 and rolls along a slot 546 formed in the third portion 516 of the sleeve 510. Of course, any suitable anti-rotation device may be used. Also, although a single anti-rotation device is shown and described, the plunger assembly 500 can have one or more, such as for example, a pair of anti-rotation devices arranged 180 degrees apart from one another.

The piston 530 of the piston assembly 511 includes an outer cylindrical surface 550 which sealing engages with a pair of lip seals 552 and 554 mounted in grooves formed in the sleeve 510. Radial passageways 556 are formed through the sleeve 510 which are in fluid communication with the reservoir conduit 296. The piston 530 includes an enlarged end portion 560 and a smaller diameter central portion 562. A seal, such as quad seal 564 is mounted in a groove formed in the enlarged end portion 560 of the piston 530. The seals 552, 554, and 564 function similarly to the seals 442, 444, and 440 of the plunger assembly 300 described above.

The piston 530 of the piston assembly 511 may optionally include a stop cushion assembly, indicated generally at 570. The stop cushion assembly 570 includes end member 572 connected to the end of the piston 530 by a bolt 574 or other fastener. The end member 572 is disposed in a recess 576 formed in the piston 530 and is mounted by the bolt 574 such that the end member 572 may move a limited amount relative to the piston 530. A spring member, such as a plurality of disc springs 578 (or Belleville washer or spring washers) bias the end member 572 in a direction away from the piston 530. The right-hand most end of the end member 572, as viewing FIG. 4, extends past the end of the piston 530. The stop cushion assembly 570 provides for a cushioned stop if the end of the piston 530 engages with a bottom wall 579 of the bore 504 by compression of the springs 578.

The piston assembly 511 may also include an optional rear stop cushion assembly, indicated generally at 580. The rear stop cushion assembly 580 includes a disc spring 582 disposed about the screw shaft 528 and engages with the end wall of the nut 534 of the piston assembly 511. The disc spring 582 may slightly compress when the piston assembly 511 is moved back its fully rested position.

A first pressure chamber 590 is generally defined by the sleeve 510, the bore 504, the enlarged end portion 560 of the piston 530, and the seal 564. A second pressure chamber 592, located generally behind the enlarged end portion 560 of the piston 530, is generally defined by the sleeve 510, the bore 504, the seals 552 and 564, and the piston 530. Passageways 594 are formed through the sleeve 510 and are in fluid communication with the second pressure chamber 592 and the conduit 308.

The piston assembly 500 operates in a similar manner as the plunger assembly 300 and will be described as being used in the system 10. For example, to actuate the wheel brakes 16a-d when the plunger assembly 500 is in its rest position, as shown in FIG. 4, the electronic control unit actuates the motor 522 in a first rotational direction to rotate the screw shaft 528 in the first rotational direction. Rotation of the screw shaft 528 in the first rotational direction causes the piston assembly 511 to advance in the forward direction (rightward as viewing FIGS. 1 and 3). Movement of the piston assembly 511 causes a pressure increase in the first pressure chamber 590 and fluid to flow out of the first pressure chamber 590 and into the conduit 306. Fluid can flow into the boost conduit 260 via the open pumping valve 304 or the check valve if the pumping valve 304 was in its closed position. Note that fluid is permitted to flow into the second pressure chamber 592 via the conduit 308 as the piston assembly 511 advances in the forward direction. Pressurized fluid from the boost conduit 260 is directed into the conduits 324 and 326 through the isolation valves 320 and 322. The pressurized fluid from the conduits 324 and 326 can be directed to the wheel brakes 16a-d through opened apply valves 340, 344, 348, and 352 while the dump valves 342, 346, 350, and 354 remain closed. When the driver releases the brake pedal 42, the pressurized fluid from the wheel brakes 16a-d may back drive the ball screw mechanism 420 moving the piston 410 back towards its rest position.

The plunger assembly 500 is a dual acting plunger assembly such that it is configured to also provide boosted pressure to the boost conduit 260 when the piston assembly 511 is stroked rearwardly. The electronic control unit actuates the motor 522 in a second rotational direction opposite the first rotational direction to rotate the screw shaft 528 in the second rotational direction. Rotation of the screw shaft 528 in the second rotational direction causes the piston assembly 511 to retract or move in the rearward direction (leftward as viewing FIGS. 1 and 3). Movement of the piston 530 causes a pressure increase in the second pressure chamber 592 and fluid to flow out of the second pressure chamber 592 and into the conduit 308. Pressurized fluid from the boost conduit 260 is directed into the conduits 324 and 326 through the isolation valves 320 and 322. The pressurized fluid from the conduits 324 and 326 can be directed to the wheel brakes 16a-d through the opened apply valves 340, 344, 348, and 352 while dump valves 342, 346, 350, and 354 remain closed. The pumping valve may be closed such that low pressure fluid fills the first pressure chamber 590.

Figure 5:
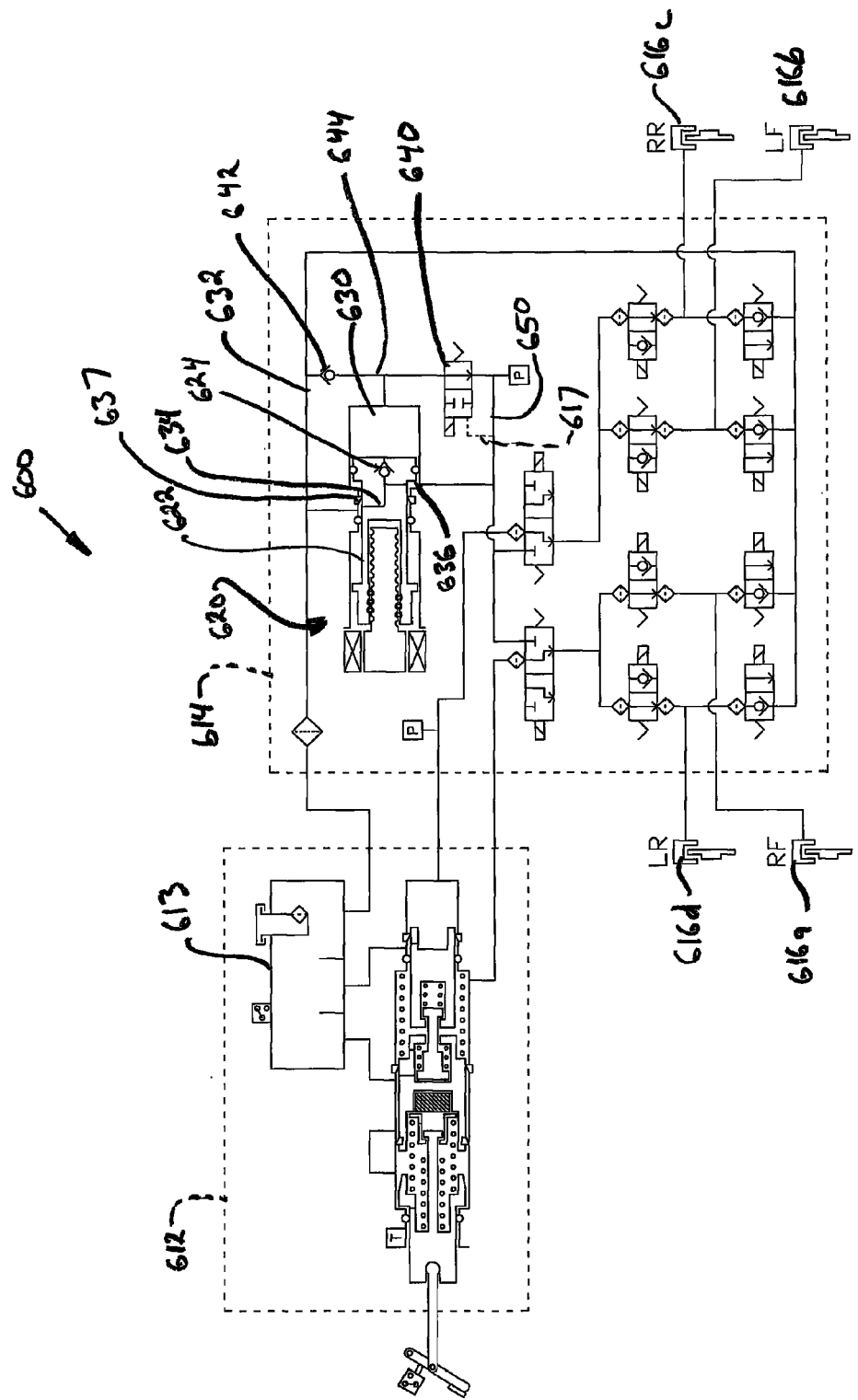
FIG. 5 is a schematic illustration of a second embodiment of a brake system.

There is illustrated in FIG. 5 a schematic illustration of a second embodiment of a brake system, indicated generally at 600. The brake system 600 is similar to the brake system 10 of FIG. 1 and, therefore, like functions and structures will not be described. Similar to the brake system 10, the brake system 600 includes a brake pedal unit 612, a hydraulic control unit 614, and wheel brakes 616a-d.

The brake system 600 does not include a venting valve like the venting valve 302 of the system 10. Instead, the brake system 600 includes a plunger assembly 620 similar to the plunger assembly 300. One of the differences is that the plunger assembly 620 has a piston 622 with a check valve 624 mounted therein. The check valve 624 permits fluid to flow from a first pressure chamber 630 to a reservoir conduit 632 (in communication with a reservoir 613) via a conduit 634 within the piston 622. It is noted that the check valve 624 prevents the flow of fluid from the reservoir 613 to the first pressure chamber 630 via the conduit 634. The check valve 624 also prevents the flow of fluid though the piston 622 from a second pressure chamber 636 to the first pressure chamber 630.

The system 600 includes a pumping valve 640 and a check valve 642. The check valve 642 is located within a conduit 644. The check valve 642 restricts the flow of fluid from the first pressure chamber 630 to the reservoir 613, while permitting the flow of fluid from the reservoir 613 to the pumping valve 640 and first pressure chamber 630. The pumping valve 640 is movable between an open position to permit the flow of fluid out of the first pressure chamber 630 and to a boost conduit 650 for delivering pressurized fluid to the wheel brakes 616a-d.

When the piston 622 advances in the forward direction, rightward as viewing FIG. 5, fluid flows out of the first pressure chamber 630 and through the de-energized pumping valve 640 into the boost conduit 650. Note that fluid is permitted to flow into the second pressure chamber 636. In the reverse stroke of the piston 622, the pumping valve 650 is energized to a closed position and fluid flows out of the second pressure chamber 636 but is prevented from flowing past the check valve 624 into the first pressure chamber 630. Note that in a reverse stroke, the piston 622 will have been moved rightward as viewing FIG. 5 such that the conduit 634 is to the right of a lip seal 637 to prevent fluid flow into the reservoir 613 from the second pressure chamber 636 via the conduit 634.

One of the advantages of the brake system 600 is a reduced cost due to not having to have a solenoid actuated venting valve. Additionally, there may not be a need to maintain power to the motor of the plunger assembly 620 on every brake apply. Another advantage is that the pumping valve only requires a small, low force, low cost, low current draw solenoid since it may hydraulically latch in a closed position as indicated by the dotted line 617 in FIG. 5. Under certain situations, the system 10 may need to be controlled to de-latch the valve 640.

Figure 6:
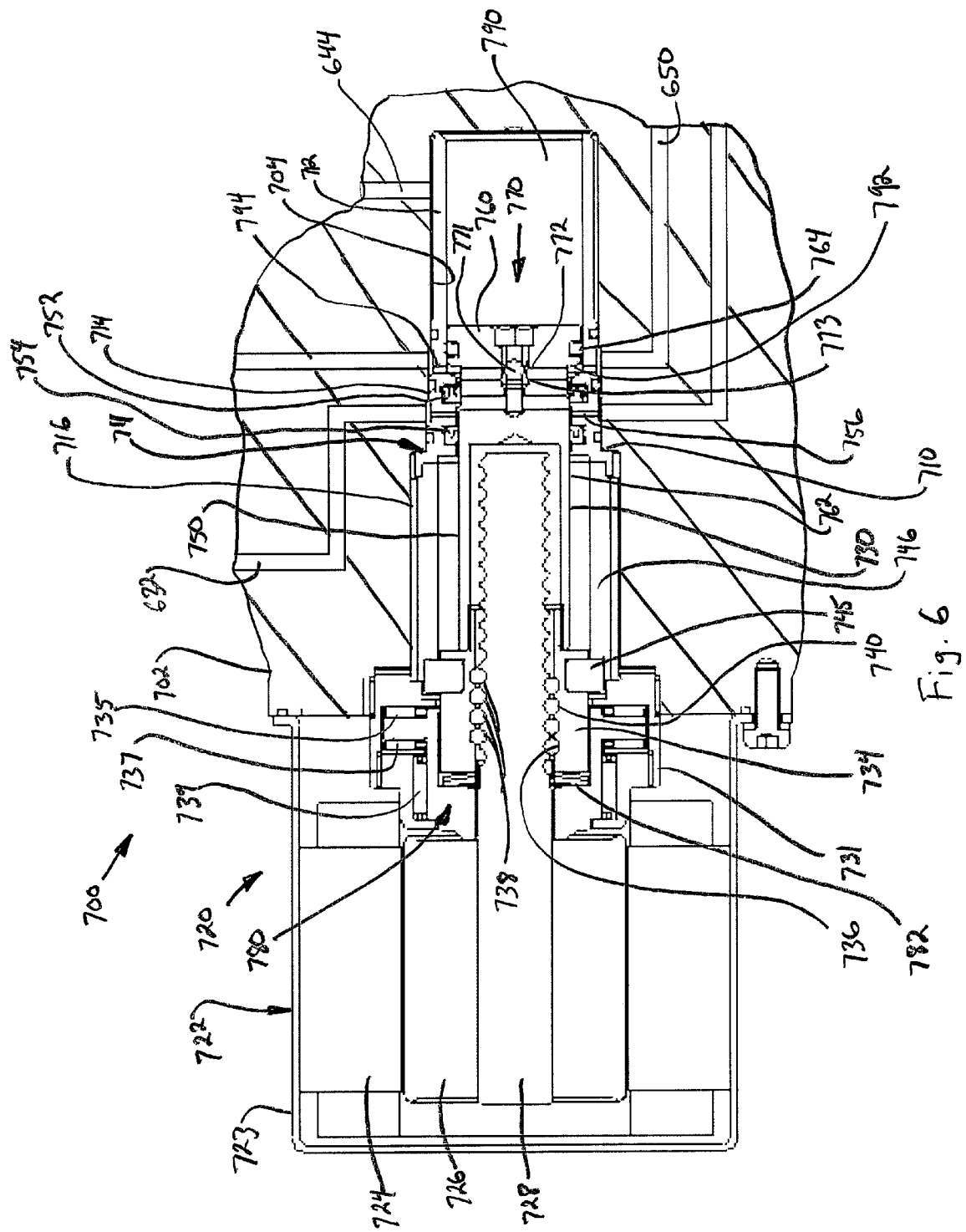
FIG. 6 is an alternate embodiment of a plunger assembly which may be used in the brake system of FIG. 5.

There is illustrated in FIG. 6 an alternate embodiment of a plunger assembly, indicated generally at 700, which may be used for the plunger assembly 620 in the brake system 600, for example. The plunger assembly 700 includes a housing 702 having a multi-stepped bore 704 formed therein. If installed into the system 600, the conduits 632, 644, and 650 are in fluid communication with the bore 704. A hollow sleeve 710 may be inserted into the bore 504. Although the components of the plunger assembly 700 may be made of any suitable material, the housing 702 may be made of aluminum for weight reduction while the sleeve 710 may be made of a hard coat anodized metal for accepting a piston assembly 711 slidably disposed therein. The sleeve 710 has a multi-stepped inner bore including a first portion 712 and a second portion 714. Instead of a third portion, a tube 716 is press fit or slip fit onto the end of the second portion 714. The tube 716 may be made of an inexpensive material, such as extruded aluminum, instead of utilizing an expensive portion of the sleeve 710.

The plunger assembly 700 further includes a ball screw mechanism, indicated generally at 720. The ball screw mechanism 720 includes a motor 722 having an outer housing 723 which houses a stator 724 for rotating a rotor 726. The rotor 726 rotates a screw shaft 728 extending along the axis of the plunger assembly 700. The front end of the rotor 526 is connected to a multi-piece support assembly 731 which is supported by generally inexpensive needle bearings (compared to more expensive roller angular contact ball bearings as shown in FIG. 4). In particular, the plunger assembly 700 includes a pair of thrust needle bearings 735 and 737 and a radial needle bearing 739. The bearings engage with features of the support assembly 731.

The piston assembly 711 includes a piston 730 threadably attached to a nut 734. The nut 734 includes an internal threaded bore 736 having helical raceways formed therein for retaining a plurality of balls 738. The balls 738 are also retained in raceways 740 formed in the outer surface of the screw shaft 728, thereby functioning as a ball screw drive mechanism. To prevent rotation of the piston assembly 711, the plunger 700 can include an anti-rotation device including one or more bushings 745 that slide within corresponding slots 746 formed in the tube 716. Of course, any suitable anti-rotation device may be used.

The piston 730 of the piston assembly 711 includes an outer cylindrical surface 750 which sealing engages with a pair of seals 752 and 754 mounted in grooves formed in the sleeve 710. Radial passageways 756 are formed through the sleeve 710 which are in fluid communication with the reservoir conduit 632. The piston 730 includes an enlarged end portion 760 and a smaller diameter central portion 762. A seal, such as quad seal 764 is mounted in a groove formed in the enlarged end portion 760 of the piston 730.

The plunger assembly 700 may include a check valve assembly 770 located in the enlarged end portion 760 of the piston 730. The check valve 770 is similar in function to the check valve 624 of the system 600. The check valve assembly 770 includes a ball 771 selectively seated on a valve seat 772 fixed relative to the piston 730. A generally small or weak spring 773 biases the ball 771 onto the valve seat 772.

The piston assembly 711 may also include an optional rear stop cushion assembly, indicated generally at 780. The rear stop cushion assembly 780 includes one or more disc spring 782 disposed about the screw shaft 728 and engaged with the end wall of the nut 734 of the piston assembly 711. The disc springs 782 may slightly compress when the piston assembly 711 is moved back its fully rested position.

A first pressure chamber 790 is generally defined by the sleeve 710, the bore 704, the enlarged end portion 760 of the piston 730, and the seal 764. A second pressure chamber 792, located generally behind the enlarged end portion 760 of the piston 730, is generally defined by the sleeve 710, the bore 704, the seals 752 and 764, and the piston 730. Passageways 794 are formed through the sleeve 710 and are in fluid communication with the second pressure chamber 792 and the conduit 650.

Figure 7:
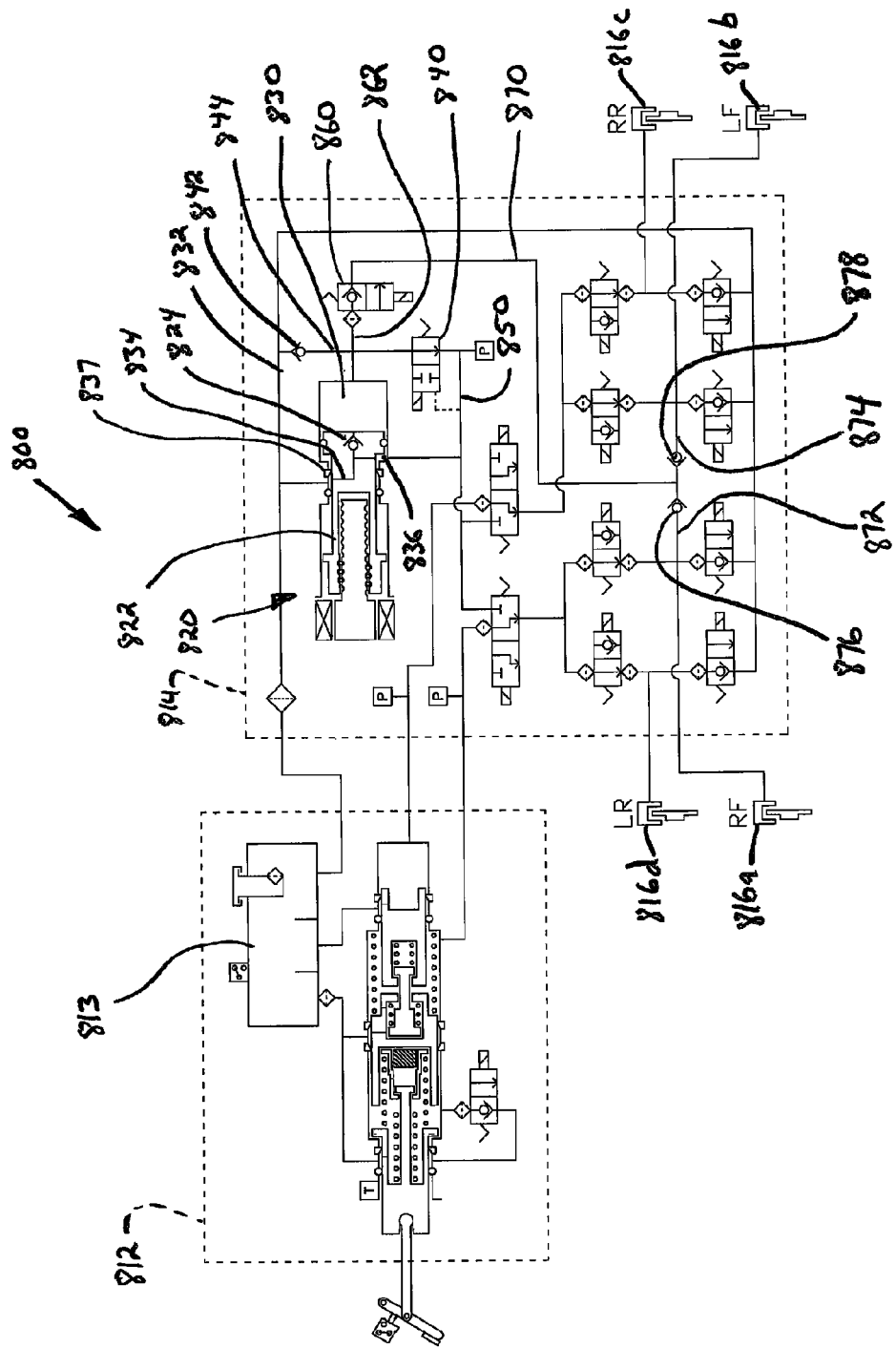
FIG. 7 is a schematic illustration of a third embodiment of a brake system.

There is illustrated in FIG. 7 a schematic illustration of a third embodiment of a brake system, indicated generally at 800. The brake system 800 is similar to the brake system 600 and, therefore, like functions and structures will not be described. The brake system 10 is ideally suited for large passenger vehicles or trucks. Generally, larger vehicles require more braking power and more fluid volume than brake systems for smaller vehicles. This generally requires a larger consumption of power for the motor for the plunger assembly.

The brake system 800 includes a brake pedal unit 812, a hydraulic control unit 814, and wheel brakes 816a-d. The brake assembly 800 further includes a plunger assembly 820 having a piston 822 with a check valve 824 mounted therein. The check valve 824 permits fluid to flow from a first pressure chamber 830 to a reservoir conduit 832 (in communication with a reservoir 813) via a conduit 834 within the piston 822. The check valve 824 prevents the flow of fluid from the reservoir 813 to the first pressure chamber 830 via the conduit 834. The check valve 824 also prevents the flow of fluid though the piston 882 from a second pressure chamber 836 to the first pressure chamber 830. The system 800 includes a pumping valve 840 and a check valve 842. The check valve 842 is located within a conduit 844. The check valve 842 restricts the flow of fluid from the first pressure chamber 830 to the reservoir 813, while permitting the flow of fluid from the reservoir 813 to the pumping valve 840 and first pressure chamber 830. The pumping valve 840 is movable between an open position to permit the flow of fluid out of the first pressure chamber 830 and to a boost conduit 850 for delivering pressurized fluid to the wheel brakes 816a-d.

Comparing the systems 600 and 800, the system 800 additionally includes a solenoid actuated quick fill valve 860. The quick fill valve 860 is in fluid communication with the second pressure chamber 830 via a conduit 862. The quick fill valve 800 is also in fluid communication with the wheel brakes 816a and 816b (such as front wheel brakes) via conduit 870, 872, and 874. The conduits 872 and 874 have check valves 876 and 878, respectively, located therein to prevent fluid from the wheel brakes flowing back into the conduit 870. The quick fill valve 860 may have relatively large orifices that enable fluid to easily flow through the quick fill valve 860 when in its energized to its open position, such as when the plunger assembly 820 is actuated to deliver high pressure fluid to the first pressure chamber 830. Since a lot of power may be required to force fluid through relatively small orifices in various valves and components of the system 800, the addition of the quick fill valve 820 helps to reduce power consumption. This is especially useful for larger vehicles when the amount of fluid flow is increased compared to smaller vehicles. The quick fill valve 860 may be left energized under normal boosted braking applications. During other events, such as anti-lock braking or slip control, the quick fill valve 820 may be moved to its closed position.

Figure 8:
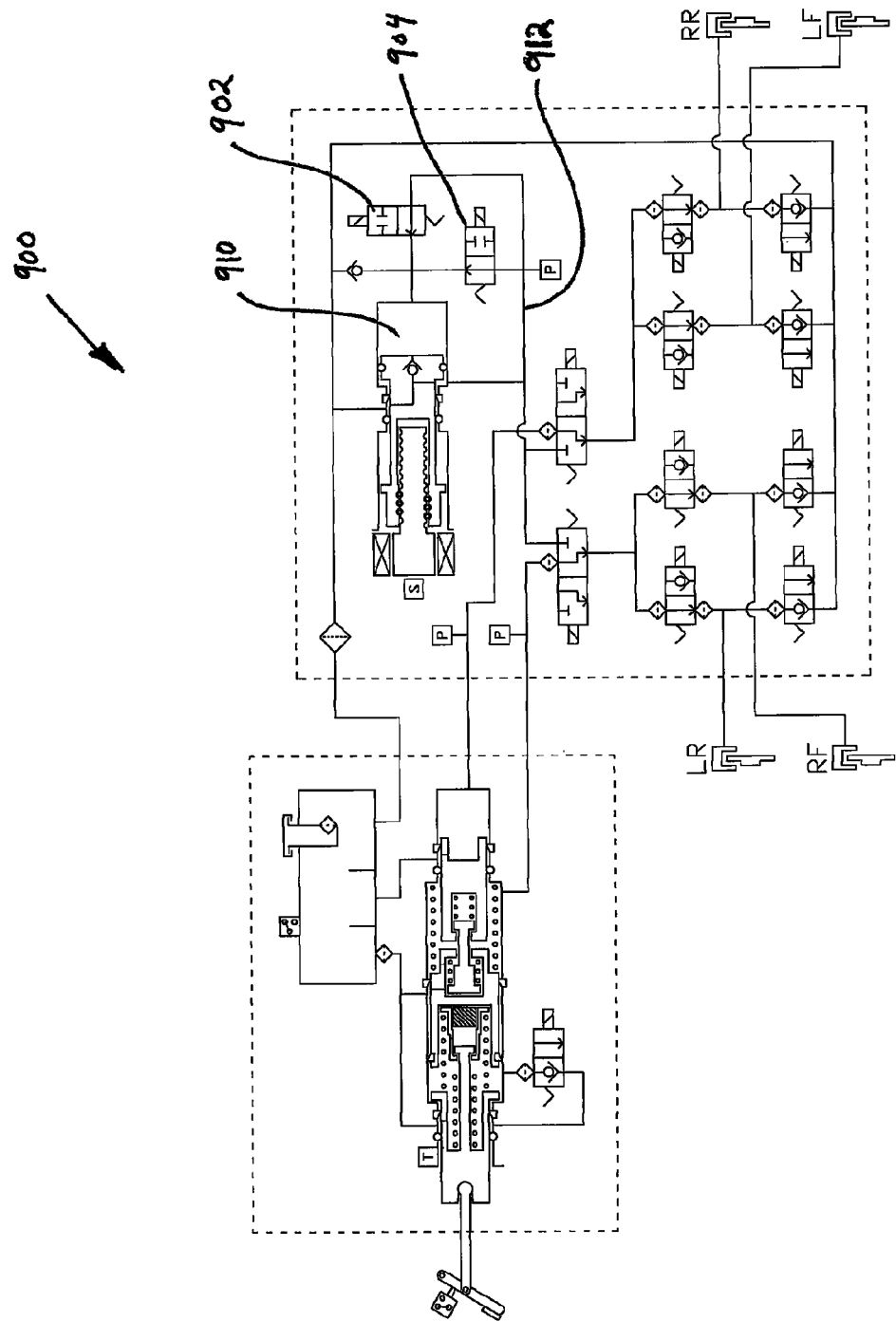
FIG. 8 is a schematic illustration of a fourth embodiment of a brake system.

There is illustrated in FIG. 8 a schematic illustration of a fourth embodiment of a brake system, indicated generally at 900. The brake system 900 is similar in structure and function as the brake system 600. Instead of using a single pumping valve 640, the system 900 includes a pair of pumping valves 902 and 904 in a parallel arrangement between a second pressure chamber 910 and boost conduit 912. It may be more cost effective to provide a pair of smaller valves than a single larger valve.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A plunger assembly for use as a pressure source for a brake system, said plunger assembly comprising:
    a housing having first and second ports;
    a reversible motor mounted on said housing for driving an actuator;
    a boost conduit for supplying fluid at a boosted pressure to the brake system;
    a first outlet conduit connecting said first port to said boost conduit;
    a second outlet conduit connecting said second port to said boost conduit;
    a piston connected to said actuator, said piston slidably mounted within said housing and, in part, defining first and second chambers on opposite sides of said piston, wherein said piston pressurizes a-said first chamber when said piston is moving in a first direction to provide fluid out of said first port to said boost conduit, and wherein said piston pressurizes a-said second chamber when said piston is moving in a second direction opposite of said first direction to provide fluid out of said second port to said boost conduit;

an electronically controlled valve located in the first outlet conduit and switchable between a first operating mode wherein said first chamber is connected to said boost conduit to (a) enable fluid flow in both directions between said first chamber and said boost conduit and (b) enable fluid flow from said first chamber into said second chamber when said piston is moved in the first direction, and a second operating mode wherein said boost conduit is disconnected from said first chamber to prevent fluid flow from said boost conduit into said first chamber when said piston is moved in the second direction.

2. The assembly of claim 1, wherein said plunger assembly is configured such that less torque is required by said motor to maintain the same pressure in said second chamber when said piston is moving in said second direction compared to pressure in said first chamber when said piston is moving in said first direction.

3. The assembly of claim 1, wherein said piston includes a first portion having a greater effective hydraulic area corresponding to said first chamber than the effective hydraulic area corresponding to said second chamber.

4. The assembly of claim 1 further including a check valve mounted in said piston, said check valve restricting the flow of fluid from said second chamber to said first chamber.

5. The assembly of claim 1 further including an anti-rotation device mounted on said piston preventing rotation of said piston.

6. The assembly of claim 1 further including a hollow sleeve mounted in said housing of said plunger assembly, wherein said piston is slidably disposed in said sleeve.

7. The assembly of claim 6, wherein said sleeve includes a tube mounted thereon, and wherein said tube is connected to said actuator.

8. The assembly of claim 1 further including a cushion member mounted on an end of said piston.

* * * * *

UNITED STATES PATENT AND TRADEMARK OFFICE
CERTIFICATE OF CORRECTION

PATENT NO. : 9,321,444 B2
APPLICATION NO. : 13/843587
DATED : April 26, 2016
INVENTOR(S) : Blaise J. Ganzel Page 1 of 1

It is certified that error appears in the above-identified patent and that said Letters Patent is hereby corrected as shown below:

In the Claims

Column 20, lines 63 and 66, after "pressurizes" remove -- a- --.

Signed and Sealed this
Twenty-sixth Day of July, 2016

Michelle K. Lee
*Director of the United States Patent and Trademark Office*